(No Model.)
J. F. LONERGAN.
LUBRICATOR.
No. 453,013. Patented May 26, 1891.
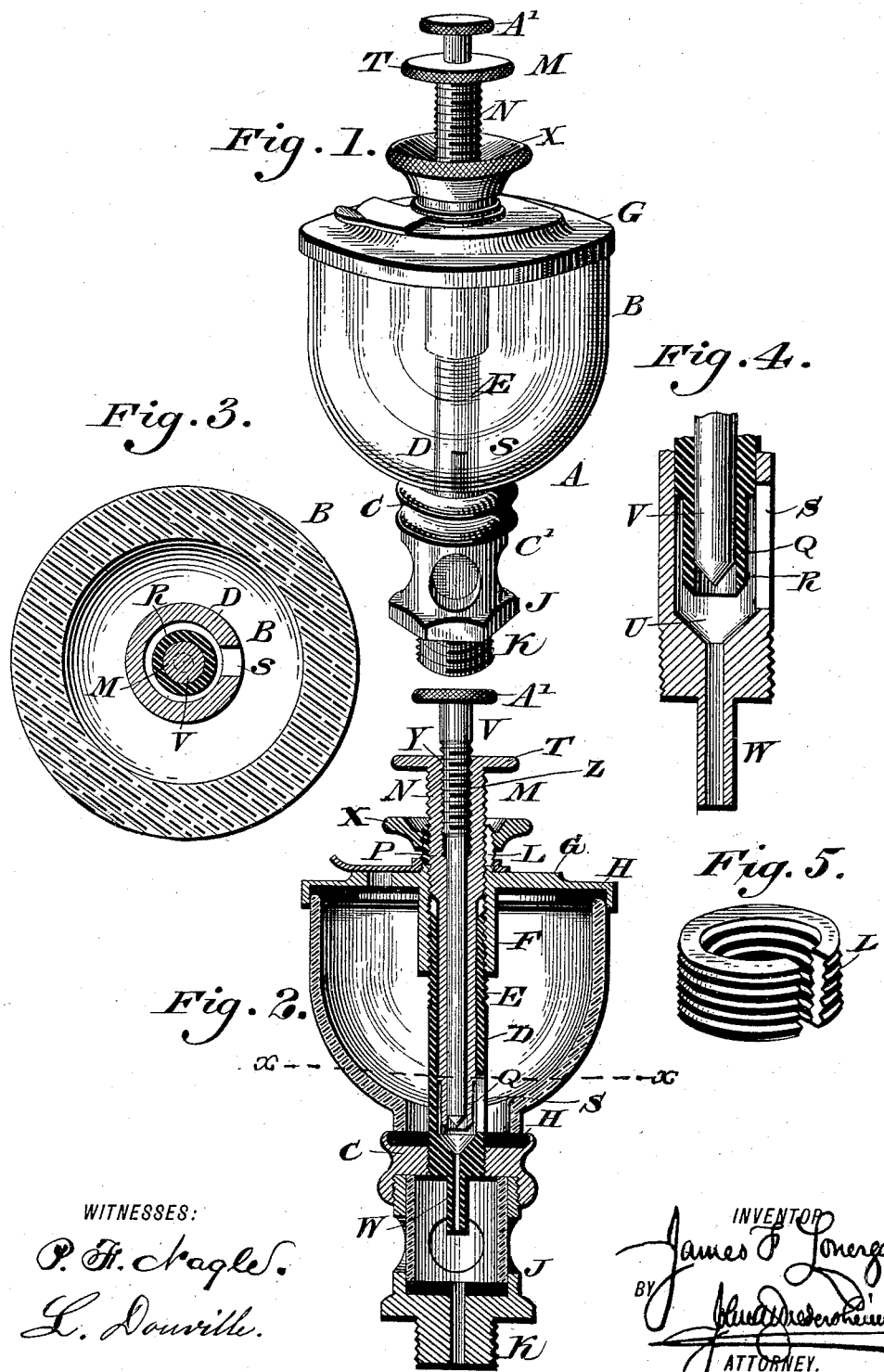

United States Patent Office.

JAMES F. LONERGAN, OF PHILADELPHIA, PENNSYLVANIA.

LUBRICATOR.

SPECIFICATION forming part of Letters Patent No. 453,013, dated May 26, 1891.

Application filed March 20, 1890. Serial No. 344,606. (No model.)

*To all whom it may concern:*

Be it known that I, JAMES F. LONERGAN, a citizen of the United States, residing in the city and county of Philadelphia, State of Pennsylvania, have invented a new and useful Improvement in Lubricators, which improvement is fully set forth in the following specification and accompanying drawings.

My invention relates to improvements in lubricators or oil-cups; and it consists, first, of a valve or tube, as hereinafter described, for adjusting the flow of the lubricant from the reservoir; second, of a valve for opening and closing the exit or outlet passage, said valve having its stem in said adjusting-tube and operating independently thereof, and, third, of the combination of parts herein described.

Figure 1 represents a perspective view of a lubricator or oil-cup embodying my invention. Fig. 2 represents a central vertical section thereof. Fig. 3 represents a horizontal section on line $x\ x$, Fig. 2, on an enlarged scale. Fig. 4 represents an enlarged side view of the lower end of the valve-stem with valve. Fig. 5 represents an enlarged perspective view of the split collar.

Similar letters of reference indicate corresponding parts in the several figures.

Referring to the drawings, A designates a lubricator or oil-cup having the reservoir B and the socket C therefor, the latter being provided with a tube D, having a screw-threaded upper end E for attachment to the interiorly-threaded depending tube F of the cap G. Within the socket C and the cap G packing H, of cork or other suitable material, is placed, so as to form close joints between the end of the walls of the reservoir and the said socket and cap. At the lower end of the base of the socket is a threaded tubular stem K for attaching the lubricator to a journal or other bearing. On the cap G is a split collar L, both interiorly and exteriorly threaded, and with the tube D forming a bearing for the adjusting or regulating tube M, which latter has a screw-threaded portion N, working in the threaded portion P of the collar L. The lower end Q of the tube M is of reduced diameter, so as to form a channel R between it and the wall of the tube D, the latter having an opening S, through which the oil or lubricant enters the channel R from the reservoir. By rotating the tube M in its bearings by means of its milled head T the same is adjusted relatively to the seat U of the opening and closing valve V, which seat is formed in the walls of the discharge or outlet tube W, within the socket, so as to form a valve regulating the size of the portion of the opening S, below the lower end of the tube M, and thereby the flow of the lubricant to the said outlet-tube W. To secure the tube M in place a jam-nut X is employed.

Within the tube M is the valve V having a conical lower end corresponding to the seat U, and a stem with a threaded portion Y working in a corresponding threaded portion Z of the tube M. A milled head A' on the said valve-stem aids in turning or operating the same.

Both the manner of using the device and the operation of the same are easily understood. To regulate the flow of the lubricant from the reservoir B, through the opening S in the tube D, the tubular valve M is adjusted by rotating the same, so that a sufficient portion of the opening S necessary to secure the required flow is uncovered. The jam-nut X is then tightened on the split collar L, securing the said tube M in place. The valve V may be opened or closed, when desired, by rotating the same, and, as is readily seen, without affecting the adjustment of the regulating tube or valve M. The channel R permits the lubricant to enter the space in the tube D, below the tube M, from all sides, instead of at a small section, so that the flow will be more uniform and less likely to be obstructed. The beveled edges of the end of the tube M also permit a more gradual adjustment of the flow.

Having thus described my invention, what I claim as new, and desire to secure by Letters Patent, is—

1. A lubricator consisting of a reservoir having an inner tube with an opening in its side leading from said reservoir, a rotary tube in said inner tube and adjustable from without said reservoir for regulating the size of said opening, said tube having a screw-threaded bearing above said reservoir, and a reduced lower portion, the latter forming an annular channel between the tube and the said inner tube, the outlet-tube W, leading from the said inner tube, and a valve having its seat in the upper end of said outlet-tube and its stem in said adjustable rotary tube and extending above the head thereof, said parts being combined substantially as described.

2. A lubricator having the reservoir B, the cap G with the depending tube F, the tube D, secured to said tube F and provided with the opening S, the said opening leading from said reservoir to the interior of said tube D, the outlet-tube W, leading from said tube D and having a valve-seat in its wall, the tube M, having a reduced or grooved lower end adapted to regulate the size of the uncovered portion of the opening S, and a valve for said outlet-tube, working in said tube M, said parts being combined substantially as described.

3. A lubricator consisting of a socket, a detachable cap with a split collar on the upper side thereof, a reservoir between said socket and cap and having an inner tube with a discharge-opening therein, a rotatable tube within said inner tube, having its lower end forming an adjusting-valve for said opening and its upper end extending above said cap and through said split collar, an outlet-tube leading from said inner tube and forming a continuation thereof, a valve with seat in said outlet-tube, and a stem extending in and above the upper end of the tubular valve, and a nut working on said split collar, said parts being combined substantially as described.

JAMES F. LONERGAN.

Witnesses:
JOHN A. WIEDERSHEIM,
WM. C. WIEDERSHEIM.